(12) United States Patent
Lin

(10) Patent No.: US 10,787,225 B2
(45) Date of Patent: Sep. 29, 2020

(54) FITTING STRUCTURE OF BOTTOM BRACKET SHELL OF BICYCLE

(71) Applicant: Chang Hui Lin, Changhu (TW)

(72) Inventor: Chang Hui Lin, Changhu (TW)

( * ) Notice: Subject to any disclaimer, the term of this patent is extended or adjusted under 35 U.S.C. 154(b) by 207 days.

(21) Appl. No.: 16/137,543

(22) Filed: Sep. 21, 2018

(65) Prior Publication Data

US 2020/0094914 A1 Mar. 26, 2020

(51) Int. Cl.
*B62M 3/00* (2006.01)
*B62K 19/30* (2006.01)

(52) U.S. Cl.
CPC ............. *B62M 3/003* (2013.01); *B62K 19/30* (2013.01)

(58) Field of Classification Search
CPC ......... B62M 3/003; B62K 19/30; B62K 19/34
See application file for complete search history.

(56) References Cited

U.S. PATENT DOCUMENTS

| | | | | |
|---|---|---|---|---|
| 5,281,003 A * | 1/1994 | Herman | .................. | B62K 19/34 301/2.5 |
| 5,460,455 A * | 10/1995 | Chen | ....................... | B62K 19/34 384/458 |
| 5,762,426 A * | 6/1998 | Lin | ......................... | B62M 3/003 384/458 |
| 8,393,794 B1 * | 3/2013 | Shiraishi | ................ | B62K 19/34 384/458 |
| 2003/0097900 A1 * | 5/2003 | Yamanaka | ............. | B62K 19/34 74/594.1 |
| 2004/0045400 A1 * | 3/2004 | Alley | ..................... | B62M 3/003 74/594.1 |
| 2008/0164673 A1 * | 7/2008 | Lane | ....................... | B62M 3/003 280/259 |
| 2009/0261553 A1 * | 10/2009 | Meggiolan | ............. | B62M 3/003 280/259 |
| 2012/0042746 A1 * | 2/2012 | Nonoshita | .............. | B62M 3/003 74/594.2 |
| 2013/0230266 A1 * | 9/2013 | Earle | ................... | B60B 27/0005 384/540 |
| 2016/0272268 A1 * | 9/2016 | Ma | .......................... | B62M 3/003 |
| 2018/0231060 A1 * | 8/2018 | Milanesio | ................. | F16D 1/02 |
| 2019/0210677 A1 * | 7/2019 | O'Reilly | .................. | B62J 25/00 |

* cited by examiner

*Primary Examiner* — Tony H Winner

(57) ABSTRACT

A fitting structure of a bottom bracket shell of a bicycle contains: a hollow body having a receiving orifice. A first engagement element includes a first engaging section, a first aperture, and a first tilted guide portion. A second engagement element includes a second engaging section, a second aperture, and a second tilted guide portion. A first sleeve includes a first accommodation portion, a first connection portion, a first rib, a first abutting portion, and a first coupling section, wherein a first conically inclined face is defined between the first sleeve and the first tilted guide portion. A second sleeve includes a second accommodation portion, a second connection portion, a second rib, a second abutting portion, and a second coupling, wherein a second conically inclined face is defined between the second sleeve and the second tilted guide portion.

3 Claims, 3 Drawing Sheets

FITTING STRUCTURE OF BOTTOM BRACKET SHELL OF BICYCLE

FIELD OF THE INVENTION

The present invention relates to a fitting structure of a bottom bracket shell of a bicycle which is applicable for hollow bodies of various lengths by using a first sleeve and a second sleeve.

BACKGROUND OF THE INVENTION

A bottom bracket on a bicycle connects the crankset (chainset) to the bicycle and allows the crankset to rotate freely. It contains a spindle that the crankset attaches to, and the bearings that allow the spindle and cranks to rotate. The chainrings and pedals attach to the cranks. The bottom bracket fits inside the bottom bracket shell, which connects the seat tube, down tube and chain stays as part of the bicycle frame.

A fitting structure of the bottom bracket shell contains bodies of various lengths and a sleeve assembly configured to fit with a specific body of a fixed size.

The present invention has arisen to mitigate and/or obviate the afore-described disadvantages.

SUMMARY OF THE INVENTION

The primary objective of the present invention is to provide a fitting structure of a bottom bracket shell of a bicycle which is applicable for hollow bodies of various lengths by using a first sleeve and a second sleeve.

To obtain above-mentioned objective, a fitting structure of a bottom bracket shell of a bicycle provided by the present invention contains: a hollow body including a receiving orifice, a first engagement element, a second engagement element, a first sleeve, and a second sleeve.

The first engagement element includes a first engaging section configured to matingly engage with a first end of the receiving orifice of the hollow body, a first aperture passing, and a first tilted guide portion.

The second engagement element includes a second engaging section configured to matingly engage with a second end of the receiving orifice of the hollow body, a second aperture, and a second tilted guide portion.

The first sleeve is fitted into the receiving orifice of the hollow body via the first aperture of the first engagement element, and the first sleeve includes a first accommodation portion, a first connection portion, a first rib, a first abutting portion, a first coupling section, wherein a first conically inclined face is defined between the first sleeve and the first tilted guide portion of the first engagement element.

The second sleeve is fitted into the receiving orifice of the hollow body via the second aperture of the second engagement element, and the second sleeve includes a second accommodation portion, a second connection portion, a second rib, a second abutting portion, a second coupling section, wherein a second conically inclined face is defined between the second sleeve and the second tilted guide portion of the second engagement element.

DETAILED DESCRIPTION OF THE PREFERRED EMBODIMENTS

Figure 1:
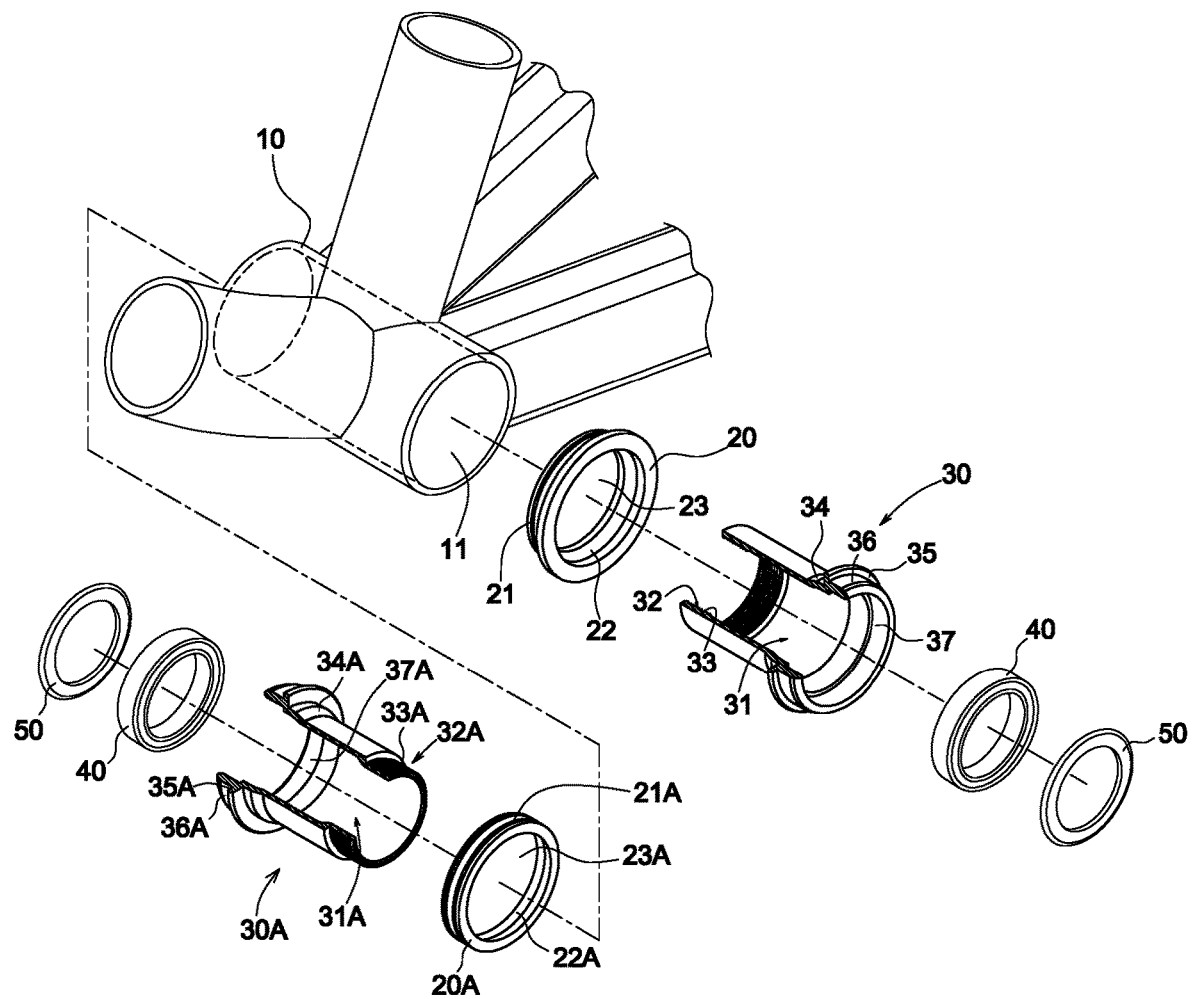
FIG. 1 is a perspective view showing the exploded components of a fitting structure of a bottom bracket shell of a bicycle according to a preferred embodiment of the present invention.

With reference to FIGS. 1-5, a fitting structure of a bottom bracket shell of a bicycle according to a preferred embodiment of the present invention comprises:

a hollow body 10 formed on a bicycle frame and including a receiving orifice 11 defined therein;

multiple engagement elements of different thicknesses being a first engagement element 20 and a second engagement element 20A;

the first engagement element 20 including a first engaging section 21 formed on an end of the first engagement element 20 so as to matingly engage with a first end of the receiving orifice 11 of the hollow body 10, a first aperture 23 passing through the first engagement element 20, and a first tilted guide portion 22 arranged on a predetermined zone of an inner wall of the first aperture 23;

the second engagement element 20A including a second engaging section 21A formed on an end of the second engagement element 20A so as to matingly engage with a second end of the receiving orifice 11 of the hollow body 10, a second aperture 23A passing through the second engagement element 20A, and a second tilted guide portion 22A arranged on a predetermined zone of an inner wall of the second aperture 23A;

a first sleeve 30 formed in a hollow tube shape and fitted into the receiving orifice 11 of the hollow body 10 via the first aperture 23 of the first engagement element 20, and the first sleeve 30 including a first accommodation portion 31 defined in the first sleeve 30, a first connection portion 32 formed on a first end of the first sleeve 30, a first rib 35 extending outward from an outer wall of a second end of the first sleeve 30, a first abutting portion 36 defined between the first rib 35 and the second end of the first sleeve 30, a first coupling section 37 formed inside the first abutting portion 36 so as to couple with a bearing 40 and a dustproof cap 50, wherein a first conically inclined face 34 is defined between the first sleeve 30 and the first tilted guide portion 22 of the first engagement element 20; and a second sleeve 30A formed in a hollow tube shape and fitted into the receiving orifice 11 of the hollow body 10 via the second aperture 23A of the second engagement element 20A, and the second sleeve 30A including a second accommodation portion 31A defined in the second sleeve 30A, a second connection portion 32A formed on a first end of the second sleeve 30A, a second rib 35A extending outward from an outer wall of a second end of the second sleeve 30A, a second abutting portion 36A defined between the second rib 35A and the second end of the second sleeve 30A, a second coupling section 37A formed inside the second abutting portion 36A so as to couple with another bearing 40 and another dustproof cap 50, wherein a second conically inclined face 34A is defined between the second sleeve 30A and the second tilted guide portion 22A of the second engagement element 20A.

When the first and second sleeves 30, 30A are fitted into the receiving orifice 11 of the hollow body 10, the first engagement element 20 abuts against the first end of the receiving orifice 11 of the hollow body 10 and the first rib 35 of the first sleeve 30, and the second engagement element 20A abuts against the second end of the receiving orifice 11 of the hollow body 10 and the second rib 35A of the second sleeve 30A, such that the first sleeve 30 and the second sleeve 30A are rotatably connected with a central shaft A by ways of the two bearings 40.

Figure 2:
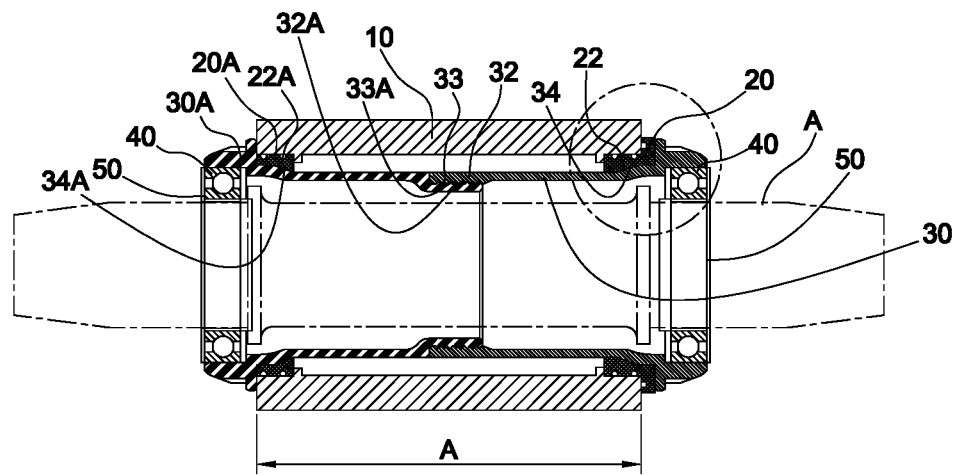
FIG. 2 is a cross sectional view showing the assembly of the fitting structure of the bottom bracket shell of the bicycle according to the preferred embodiment of the present invention.
Figure 3:
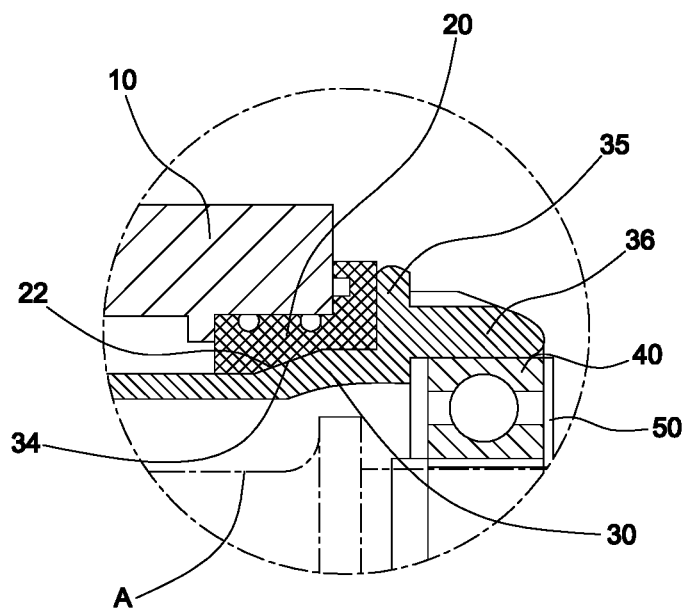
FIG. 3 is an amplified cross sectional view of FIG. 2.

As shown in FIG. 2, the first sleeve 30 and the second sleeve 30A are fitted with the hollow body 10, a length A of which is 72.6 mm, and the hollow body 10 is fitted with the first engagement element 20 and the second engagement element 20A.

Preferably, the first and second conically inclined faces 34, 34A correspond to the first and second tilted guide portions 22, 22A respectively so that the first engagement element 20 and the first sleeve 30 are connected with the hollow body 10 securely.

Figure 4:
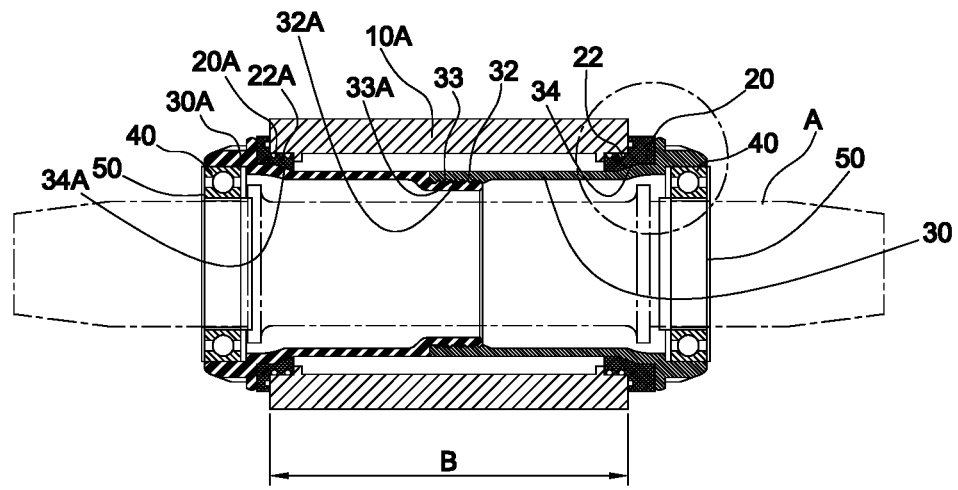
FIG. 4 is another cross sectional view showing the assembly of the fitting structure of the bottom bracket shell of the bicycle according to the preferred embodiment of the present invention.
Figure 5:
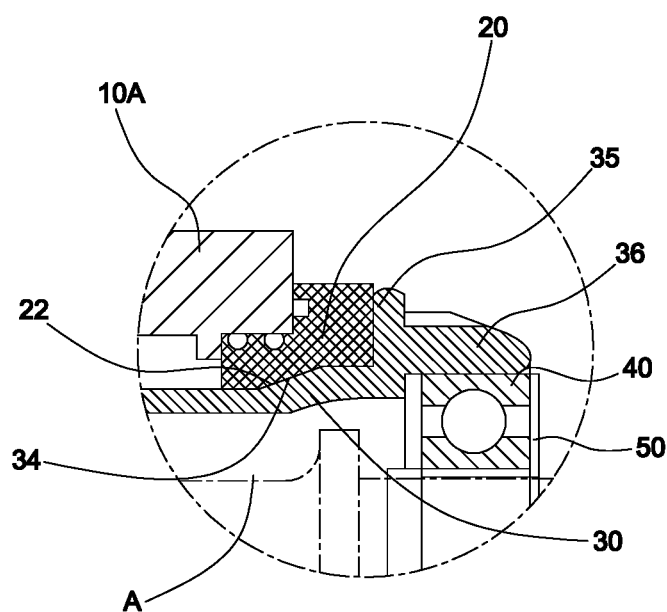
FIG. 5 is an amplified cross sectional view of FIG. 4.

As illustrated in FIG. 4, the first sleeve 30 and the second sleeve 30A are fitted with the hollow body 10, a length B of which is 67.6 mm, and the hollow body 10 is fitted with the first engagement element 20 and the second engagement element 20A. Preferably, the first and second conically inclined faces 34, 34A correspond to the first and second tilted guide portions 22, 22A respectively so that the first engagement element 20 and the first sleeve 30 are connected with the hollow body 10 securely.

Furthermore, the first connection portion 32 of the first sleeve 30 has a first threaded section 33, and the second connection portion 32A of the second sleeve 30A has a second threaded section 33A screwing with the first threaded section 33.

Preferably, a thickness of the first engagement element 20 is more than that of the second engagement element 20A so that the first engagement element 20 is rotatably connected with a chainwheel set (not shown) of a bicycle.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A fitting structure of a bottom bracket shell of a bicycle comprising:

a hollow body formed on a bicycle frame and including a receiving orifice defined therein;

multiple engagement elements of different thicknesses being a first engagement element and a second engagement element;

the first engagement element including a first engaging section formed on an end of the first engagement element so as to matingly engage with a first end of the receiving orifice of the hollow body, a first aperture passing through the first engagement element, and a first tilted guide portion arranged on a predetermined zone of an inner wall of the first aperture;

the second engagement element including a second engaging section formed on an end of the second engagement element so as to matingly engage with a second end of the receiving orifice of the hollow body, a second aperture passing through the second engagement element, and a second tilted guide portion arranged on a predetermined zone of an inner wall of the second aperture;

a first sleeve formed in a hollow tube shape and fitted into the receiving orifice of the hollow body via the first aperture of the first engagement element, and the first sleeve including a first accommodation portion defined in the first sleeve, a first connection portion formed on a first end of the first sleeve, a first rib extending outward from an outer wall of a second end of the first sleeve, a first abutting portion defined between the first rib and the second end of the first sleeve, a first coupling section formed inside the first abutting portion so as to couple with a bearing and a dustproof cap, wherein a first conically inclined face is defined between the first sleeve and the first tilted guide portion of the first engagement element; and a second sleeve formed in a hollow tube shape and fitted into the receiving orifice of the hollow body via the second aperture of the second engagement element, and the second sleeve including a second accommodation portion defined in the second sleeve, a second connection portion formed on a first end of the second sleeve, a second rib extending outward from an outer wall of a second end of the second sleeve, a second abutting portion defined between the second rib and the second end of the second sleeve, a second coupling section formed inside the second abutting portion so as to couple with another bearing and another dustproof cap, wherein a second conically inclined face is defined between the second sleeve and the second tilted guide portion of the second engagement element.

2. The fitting structure as claimed in claim 1, wherein the first connection portion of the first sleeve has a first threaded section, and the second connection portion of the second sleeve has a second threaded section screwing with the first threaded section.

3. The fitting structure as claimed in claim 1, wherein a thickness of the first engagement element is more than that of the second engagement element.

* * * * *